Patented Oct. 14, 1930

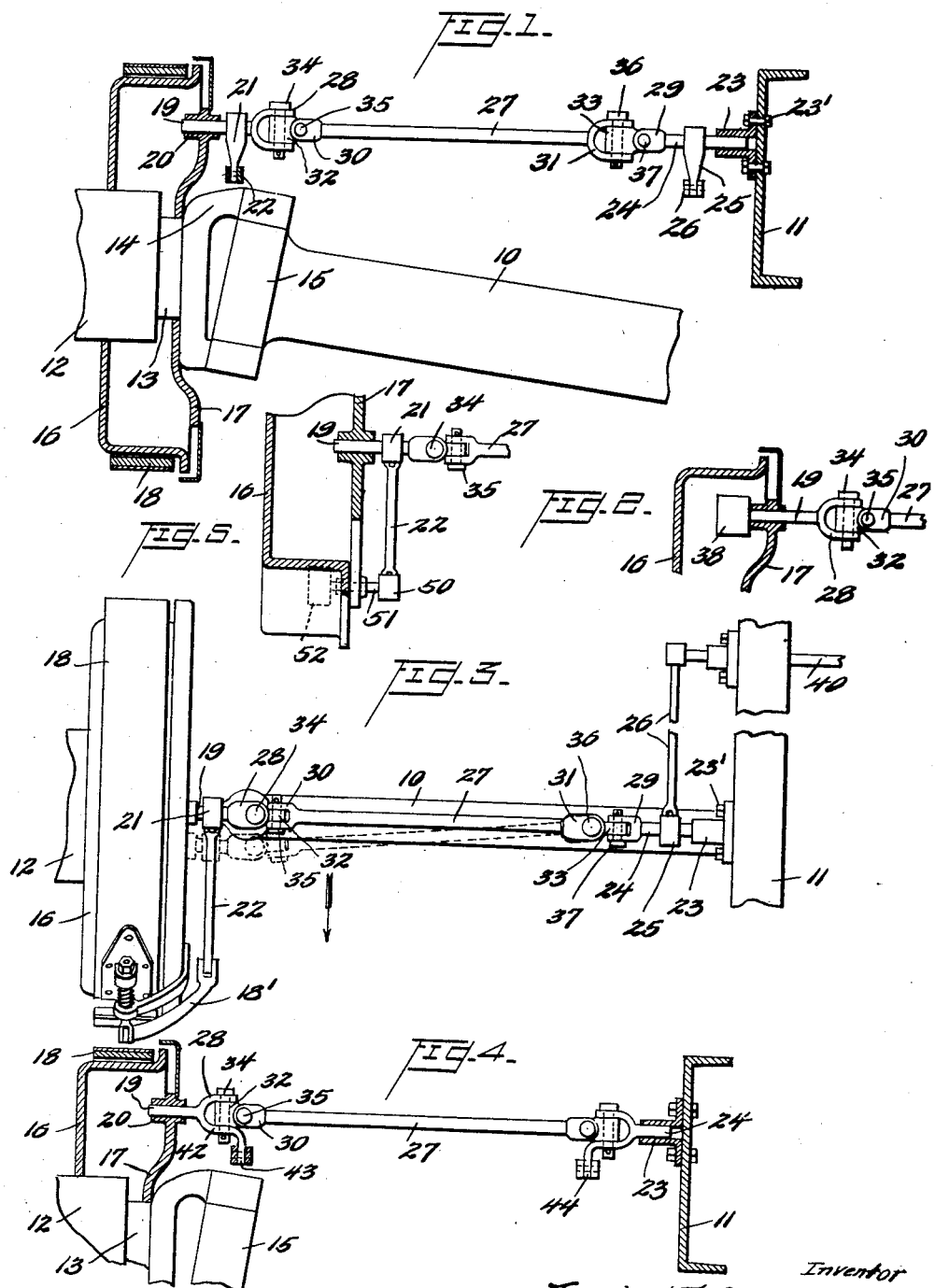

1,778,254

UNITED STATES PATENT OFFICE

EDWIN BRENTON FLANIGAN, OF WILKES-BARRE, PENNSYLVANIA, ASSIGNOR TO E. B. FLANIGAN, INC., OF WILKES-BARRE, PENNSYLVANIA, A CORPORATION OF PENNSYLVANIA

BRAKE-OPERATING MECHANISM

Application filed January 13, 1927. Serial No. 160,975.

This invention relates to brake operating mechanism and more particularly to such mechanism for use in connection with the wheels of automotive vehicles which are arranged on spindles pivoted to an axle, the axis of the pivots being such as to allow movement of the wheels for steering.

It is a general object of this invention to provide novel and improved operating means for the steering wheels of automotive vehicles.

More particularly it is an object of the invention to provide an operating mechanism of the type described which is not affected by relative movement between the axle and the chassis frame, between the brake mechanism and chassis frame or by the rotation or "roll" of the axle.

One of the features of the invention consists in minimizing the effect, on the brakes, of movement of the axle, whether rotational or linear in respect to the chassis frame.

Another feature consists in providing a simplified operating mechanism readily fitted to various sizes and types of vehicles.

A further feature consists in making certain parts of the mechanism interchangeable.

Another and further feature consists in providing, in a brake operating mechanism, a universal joint, one yoke of which is arranged with an extension which forms an operating lever.

Other and further objects and features will be more apparent to those skilled in the art by a consideration of the following specification which, when taken in conjunction with the accompanying drawing, discloses several exemplary embodiments of the invention, it being understood, however, that various changes may be made therein such as fall within the scope of the appended claims without departing from the spirit of the invention.

In said drawing:

Fig. 1 is an elevation, partly in section, showing a portion of a chassis frame, a portion of a front axle, the brake drum and brake mechanism and the operating mechanism;

Fig 2 is a fragmentary view corresponding to Fig. 1 but showing a different means for operating the brake;

Fig. 3 is a plan view of the parts disclosed in Fig. 1 showing in dotted lines a condition existing upon the sudden application of the brakes;

Fig. 4 is a view similar to Fig. 1 showing a modification of that construction; and Fig. 5 is a plan view partially in horizontal section of a further modification.

The steering wheels, usually the front wheels, of an automotive vehicle or a trailer, are mounted on bearing spindles which are pivoted to an axle, the axis of the pivots being more or less vertical to allow turning of the wheels. In conventional constructions the axle is connected to the chassis frame by a spring or springs allowing considerable relative movement between the axle and the frame. The brakes, operating on drums on the wheels, must be applied through some mechanism, the effort initiating from some point rigidly connected to the chassis frame. This entails some form of universal coupling which will allow the wheels to be turned for steering and will allow the flexing of the vehicle springs while still maintaining connection between the brake mechanism on the wheel spindle and the operating mechanism on the chassis frame. This type of connection may effectively be a brake shaft journaled in a brake support carried by the spindle, a stub shaft journaled on a chassis frame member, and an intermediate shaft universally connected between the two aforementioned shafts. It is preferred to have the connection between the brake shaft and the intermediate shaft lie in an extension of the spindle pivot, so that upon steering, the brake operating shaft assembly will bend in line with this pivot. To take care of side sway and spring flexure, some form of slip joint must be incorporated between the chassis frame and the brake shaft support. When brakes are applied suddenly while the vehicle is moving, there is a strong tendency to rotate the axle due to the friction between the brake drums and the brake parts carried by the axle. This "roll" serves to displace the brake shaft from its usual vertical or substantially vertical alignment over the axle, in which position it must be placed owing to the aforementioned arrangement of the universal joint. Any operating lever projecting upwardly or downwardly from the brake shaft or from the intermediate shaft is thus displaced forwardly or rearwardly of the axle and consequently similarly displaced in respect to the portion of the brake operating mechanism on the chassis, whereby the brakes are either more tightly applied or partially or wholly released due to this "roll." The present invention contemplates so positioning the operating lever that it will not be affected by a movement of the axle so that such movement has no effect on the brake.

Referring to the drawing, there is disclosed at 10 a vehicle axle attached by springs, not shown, to a suitable portion of the chassis frame such for instance as the longitudinal side member 11 and hence movable in respect thereto. The wheel hub 12 is journaled on a spindle 13 which has attached thereto the yoke 14 straddling the end 15 of the axle, a suitable hinge or king pin passing through the parts 14 and 15 whereby the wheel may be turned for steering. A brake drum 16 is attached to the wheel hub for rotation therewith and some form of brake supporting means such as the plate 17 is rigidly attached to the spindle so that no rotation of the same may occur. In Fig. 1 there has been shown a contracting band type of brake, the band being seen at 18. It is anchored in any desired manner to the support 17 and may be contracted by a suitable linkage such as shown in Fig. 3. The contracting mechanism includes a lever 18' extending substantially parallel to the face of the support 17.

To actuate this lever from suitable mechanism on the chassis frame, such as a foot pedal and connecting linkage, there has been provided what may be termed a brake shaft 19 journaled in a boss or other suitable bearing member 20 on the support 17. A depending lever 21 is secured to this brake shaft and may be connected by a link 22 to the lever 18' forming a portion of the contracting mechanism for the brake band. On the chassis frame side member 11 is mounted a journal or bearing member 23 attached thereto by bolts or other suitable fastening means 23'. Received in the bore in this journal is the stub shaft 24. This shaft is provided with the lever or arm 25 which may be connected, by the link 26, to a brake applying mechanism mounted on the chassis frame in any suitable manner.

The stub shaft is substantially fixed in respect to the chassis frame and the brake shaft in respect to the support 17 rigid with the wheel spindle. To connect these two shafts which are movable in respect to each other, there is provided an intermediate shaft 27. Each of the brake and stub shafts is provided with the yoke 28, 29 and the two ends of the intermediate shaft likewise have yokes 30 and 31. A suitable block 32, 33 is provided for each pair of corresponding yokes and is drilled with holes at right angles to receive the hinge pins 34, 35, 36 and 37. The yokes 28 and 30 and the block 32 and corresponding hinge pins comprise a universal joint and it lies substantially in an extension of the axis of the king pin which connects the yoke 14 to the axle end 15 so that when the wheel moves about the king pin in steering, the brake shaft can move in respect to the intermediate shaft without any strain. The second universal joint constituted by the yokes 29 and 31 and the block 33 with the corresponding hinge pins further provides for movement of the axle in respect to the chassis frame such as upon the compression or extension of the springs, whereupon the two universal joints allow for relative movement of the axle and stub shafts. To take care of the necessary change in distance between the frame member 11 and the support 17 the stub shaft or the brake shaft or both may be longitudinally slidable in their respective journals or bearings.

The stub shaft and the brake shaft may be identical in size and in shape so that they are thus interchangeable. The yokes forming the inner portions of the universal joints may have any suitable length of rod welded thereto to form the intermediate shaft 27 so that the mechanism may readily be attached to any style or size vehicle. In order to prevent the "roll" of the axle as previously described, from effecting rotation of the shaft assembly, the lever 25 has been placed on the stub shaft which is fixed in respect to the longitudinal axis of the chassis frame. Heretofore, this lever has been placed on the intermediate shaft 27 and unless it has been made so long that it extends substantially to the middle of the axis of rotation of the axle, serious derangement of the braking is caused by axle "roll". A long lever is highly undesirable. It has sometimes been suggested to use a fore and aft equalizer between the front and rear sets of brakes to overcome the effect of this roll. While this serves to distribute the tightening or loosening of the front brakes throughout the complete set of brakes, it does not eliminate the difficulty but does maintain a better balance between the braking energy front and rear. The present arrangement eliminates the need of such an equalizer and materially simplifies the brake rigging and layout.

In Fig. 2 the lever 19 is shown as projecting through the support 17 and having applied on its inner end the cam 38 which is adapted to cooperate with the cam followers of a pair of internal brake shoes, not shown, whereby the device becomes operative to actuate the internal expanding type of brakes, rather than external contracting.

In Fig. 3 is shown a plan view of the parts disclosed in Fig. 1 and in dotted lines is shown the position assumed by the various parts when "rolling" of the axle takes place, assuming that the vehicle is moving in the direction of the arrow and that the brakes have been suddenly applied. It will be seen that the parts above the axle move in effect in a forward direction causing a displacement of the normal alignment of the three sections of the operating shaft. It will be seen, however, that the stub shaft 24 has not moved in relation to the brake cross shaft 40 which is presumed to be connected to the pedal linkage in any suitable manner, so that with no relative displacement between the shafts 24 and 40, no action tending to apply or release the brakes takes place.

In Fig. 4 is shown a modified arrangement of the device shown in Fig. 1. In this construction the yoke 28 has its lower arm 42 longer than the upper arm and bent at substantially right angles to the shaft to form the lever 43 which then may take the place of the lever 21 shown in Fig. 1. It may be made integral with the yoke and brake shaft to thus increase the strength. The universal yoke on the stub shaft 24 may be constructed in the same manner to provide the depending lever 44. Otherwise the construction of the parts disclosed in Fig. 4 is identical with those in Fig. 1. It will be seen that the shafts 19 and 24 are again interchangeable and that a reduction in the number of parts and an increase in the strength thereof has been effected. Here again one or both of the short shafts may be slidable in its journal and a cam may be used on the end of the shaft 19 rather than the depending projection 43 on the yoke thereof, where internal brakes are to be actuated.

A further advantage of the present invention consists in maintaining the brake pull rods such as 26 much closer in toward the chassis frame than in the constructions heretofore suggested so that they may be more completely housed for protection and for the sake of hiding them to add to the appearance of the vehicle.

In some cases it may be desirable to locate the cam which expands a set of internal brakes at some position other than directly above the axle, in which case the construction shown in Fig. 5 may be resorted to. Here the parts are constructed as in Figs. 1 and 3, but the link 22, instead of connecting to an operating lever which contracts an external band brake this link connects to a lever 50 attached to a shaft 51 having a bearing in the plate 17 and passing through that bearing and carrying on its inner end the cam 52. The operation is identical with that of the modification shown in Figs. 1 and 3, but an internal expanding type of brake is used rather than an external contracting. The position of the cam 52 and its shaft 51 is more or less immaterial as long as the levers 21 and 50 may be suitably connected by the link 22 without having the link interfere with the wheel spindle or its yoke 14.

Having thus described the invention, what is claimed as new and desired to be secured by Letters Patent is:

1. The combination with a vehicle frame member and a wheel spindle adapted to rotate about a substantially vertical axis, of a supporting plate on said spindle, a brake shaft journaled in said plate for rotational and sliding movements, a stub shaft journaled to said member, an intermediate shaft and universal joints connecting said intermediate shaft to said brake and stub shafts for the purpose described.

2. The combination with a vehicle frame member and a wheel spindle adapted to rotate about a substantially vertical axis, of a supporting plate on said spindle, a brake shaft journaled in said plate, a stub shaft journaled to said member, an intermediate shaft and a universal joint connecting each end of the intermediate shaft to one end of the other shafts, both of said first mentioned shafts being slidable in their journals.

3. The combination with a vehicle frame member and a wheel spindle adapted to rotate about a substantially vertical axis carried by an axle spring-supported from said frame, of a supporting means movable with said spindle, a brake shaft journaled in said means, a stub shaft journaled to said member, said brake and stub shafts being interchangeable, an intermediate shaft between said stub and brake shafts and universally connected thereto and means to rotate said shaft assembly.

4. A shaft assembly for front wheel brake operation, including in combination, a brake shaft, a yoke on one end thereof, a stub shaft, a yoke on one end thereof, said yokes being similar, a yoke universally mounted on each of said first mentioned yokes and means to attach an intermediate shaft between said last mentioned pair of yokes, said stub and brake shafts being interchangeable.

5. A shaft assembly for front wheel brake operation, including in combination, a stub shaft, a yoke on one end thereof, one arm of said yoke having an extension forming a lever extending away from said shaft and adapted to rotate said stub shaft, a brake shaft having a yoke one arm of which has an extension forming a brake operating lever extending away from said shaft and an intermediate shaft universally connected to each of said yokes.

In testimony whereof I hereunto affix my signature.

EDWIN BRENTON FLANIGAN.